(12) United States Patent
Lehr et al.

(10) Patent No.: US 7,161,882 B2
(45) Date of Patent: Jan. 9, 2007

(54) METHOD AND ARRANGEMENT FOR REGULATING THE LIGHT POWER OF A SCANNING BEAM IN AN APPARATUS FOR READING FROM OR FOR WRITING TO OPTICAL RECORDING MEDIA

(75) Inventors: Steffen Lehr, Villingen-Schwenningen (DE); Dietmar Bräuer, Villingen-Schwenningen (DE); Volker Neiss, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 339 days.

(21) Appl. No.: 10/451,476

(22) PCT Filed: Dec. 10, 2001

(86) PCT No.: PCT/EP01/14462

§ 371 (c)(1), (2), (4) Date: Jun. 18, 2003

(87) PCT Pub. No.: WO02/052553

PCT Pub. Date: Jul. 4, 2002

(65) Prior Publication Data

US 2004/0052185 A1 Mar. 18, 2004

(30) Foreign Application Priority Data

Dec. 22, 2000 (DE) ................................ 100 64 775

(51) Int. Cl.
*G11B 5/09* (2006.01)
*G11B 7/00* (2006.01)

(52) U.S. Cl. ................. 369/47.51; 369/116; 369/47.55; 369/53.25

(58) Field of Classification Search .................... None
See application file for complete search history.

(56) References Cited

U.S. PATENT DOCUMENTS

| 4,516,242 A | * | 5/1985 | Yokota ........................ 369/116 |
| 4,733,398 A | * | 3/1988 | Shibagaki et al. ............ 369/116 |
| 4,813,034 A | * | 3/1989 | Mashimo ..................... 369/116 |
| 5,008,888 A | * | 4/1991 | Numata et al. ......... 372/29.014 |

(Continued)

FOREIGN PATENT DOCUMENTS

EP  352125  1/1990

OTHER PUBLICATIONS

Copy of search report dated May 15, 2002.

*Primary Examiner*—Andrea Wellington
*Assistant Examiner*—Jorge L. Ortiz-Criado
(74) *Attorney, Agent, or Firm*—Joseph J. Laks; Harvey D. Fried; Patricia Verlanqieri

(57) ABSTRACT

In order to compensate for so-called clipping effects, it is proposed, in an apparatus for reading from and/or writing to an optical recording medium in which the light power of a laser diode (1) is to be set to a plurality of light power levels, to perform a calibration to a specific light power level (LP2) before the actual regulation of the light power. On account of the calibration, the instantaneous gradient of the characteristic curve which describes the dependence of the laser light power on the laser diode current can be inferred in order, on the basis of this information, to take account f a change—caused, for example, by ageing r clipping effects—in the characteristic curve gradient in the course of the subsequent regulation of the light power of the scanning beam generated by the laser diode (1).

6 Claims, 5 Drawing Sheets

U.S. PATENT DOCUMENTS

Figure 1:
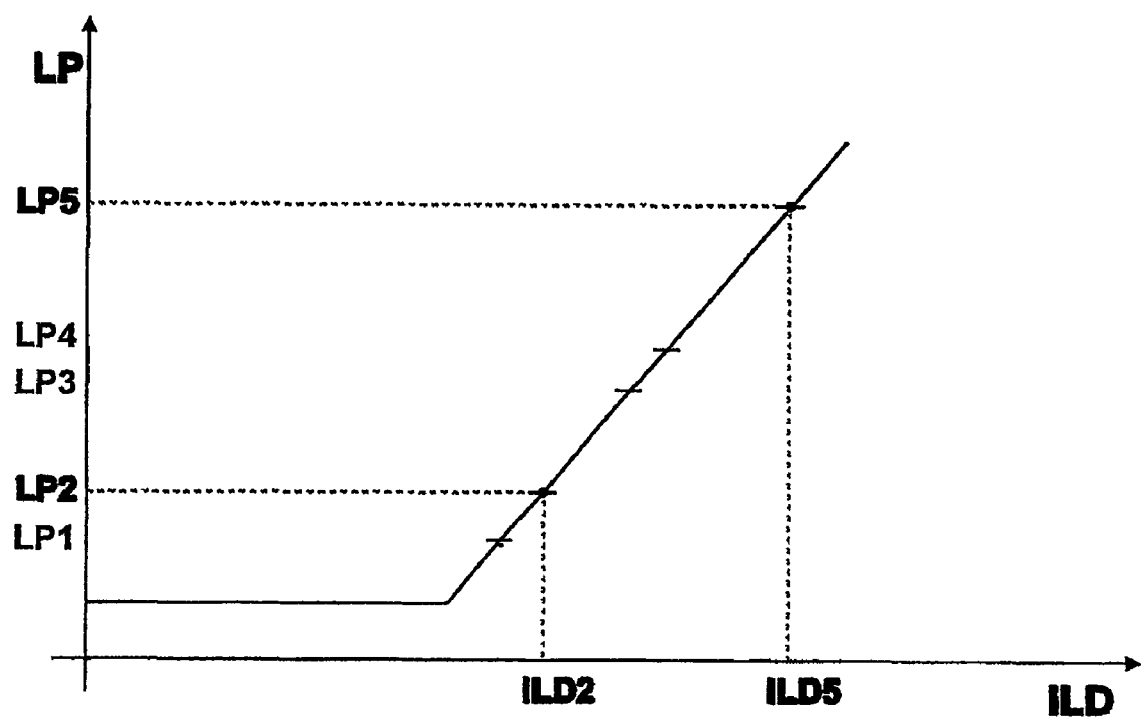

| | | | |
|---|---|---|---|
| 5,067,122 A | * | 11/1991 | McGee ........................ 369/116 |
| 5,172,365 A | * | 12/1992 | Call et al. .................... 369/116 |
| 5,197,059 A | * | 3/1993 | Minami et al. ............. 369/116 |
| 5,231,625 A | * | 7/1993 | Hokozono et al. .......... 369/116 |
| 5,309,461 A | * | 5/1994 | Call et al. ................. 372/38.09 |

* cited by examiner

METHOD AND ARRANGEMENT FOR REGULATING THE LIGHT POWER OF A SCANNING BEAM IN AN APPARATUS FOR READING FROM OR FOR WRITING TO OPTICAL RECORDING MEDIA

This application claims the benefit, under 35 U.S.C. § 365 of International Application PCT/EP01/14462, filed Dec. 10, 2001, which was published in accordance with PCT Article 21(2) on Jul. 4, 2002 in English and which claims the benefit of German patent application No. 10064775.8, filed Dec. 22, 2000.

The present invention relates to a method and an arrangement for regulating the light power of a scanning beam in an apparatus for reading from or for writing to optical recording media.

In order to write or record information on an optical recording medium, such as a DVD for example, the optical recording medium is irradiated with a scanning beam generated by a laser diode for example. In this case, the optical recording medium has a recording layer for storing the desired information, whose degree of reflection or direction of polarization is changed by the irradiation with the scanning beam. In order to ensure that the desired information is written precisely with predetermined length and width to the optical recording medium by means of the laser light intensity of the scanning beam, the write signal or the laser light of the scanning beam must be generated in such a way that laser light is provided which has pre-determined laser light intensity levels or light power levels over predetermined periods of time. This modulation of the scanning beam or of the corresponding laser light is referred to as the writing strategy, which the manufacturer of the respective optical recording medium generally specifies in the so-called lead-in region in the form of data stored on the recording medium.

In order to record information on an optical recording medium, such as a DVD-RAM for example, it is necessary to provide a plurality of different light power levels, which may also vary depending on the recording medium, with high accuracy over a period of time corresponding to the service life of the apparatus. The information to be written to the recording medium comprises very small dimensions of the physical information on the disc, which requires a very high speed in the event of changeover to different light power levels, which is furthermore increased as the writing speed increases. This requires numerous regulating circuits which, inter alia, are also intended to compensate for ageing phenomena of the components used.

The invention is based on the object of providing a method and an arrangement for regulating the light power of a scanning beam in an apparatus for reading from or for writing to an optical recording medium which make it possible to provide different light power levels with high accuracy and speed over a long period of time with a low outlay.

This object is achieved by means of features specified in independent claims. Advantageous embodiments are specified in dependent claims.

One aspect of the invention is to provide a plurality of different light power levels with high accuracy using a small number of regulating circuits, and a further aspect of the invention is to ensure that this accuracy is ensured despite tolerances and ageing phenomena over a long period of time.

The invention provides a calibration to a first predetermined light power level, which is established in the case of a power fed to the light source or a laser diode current fed to a laser diode, in order to determine the power required for a second predetermined light power level or the required laser diode current and, using the measured values, both to set predetermined light power levels with high accuracy and to compensate for changes in the light power depending on the power fed or on the laser diode current fed.

A semiconductor laser driving apparatus for supplying a driving current to a semiconductor laser device of an optical disk recording and reproducing system, the level of which is changed to adjust the optical output of the laser to one of plural levels corresponding to positions of an optical disk which is irradiated by a laser beam emitted from the laser device is already known from EP-A-0 352 125 A2.

Provision is made for carrying out a calibration to at least one light power level of the light source or of the scanning beam generated by the respective light source, such as a laser diode for example, in order to carry out the regulation of the light power of the scanning beam on the basis of this calibration.

The rise of the characteristic curve which represents the dependence of the light power on the power fed or on the laser diode current is determined for this purpose. This enables both the setting of every desired light power level with high accuracy and the compensation of ageing phenomena, such as, for example, a reduced light power given the same laser diode current under comparable conditions.

The use of a regulating circuit formed with a monitor diode means that only one calibration to a light power level is necessary. This can be attributed to the fact that the calibrated monitor diode signal corresponds to a first predetermined light power level and a regulating deviation corresponding to a second predetermined light power level is compensated until a corresponding monitor diode signal is established. The calibration factor that is set is maintained and the monitor diode signal is directly proportional to the light power level. In other words, this means that, for example, a doubling of the light power level is set if the monitor diode signal has also doubled and a regulating deviation has been compensated. It follows from this that calibration to a single light power level already suffices to set every desired light power level with high accuracy.

Since the information to be written to the optical recording medium is recorded in the form of very small dimensions of the physical information on the disc, a very fast changeover between different light power levels is necessary. The requirements imposed on the changeover speed are furthermore increased as the recording or writing speed increases. Provision is made, therefore, of regulation or control of the light power levels in the case of which only necessary light power level changes are set. The speed is nevertheless so high that, in the case of currently available technology, it is necessary to provide the desired values for required light power levels in parallel. A changeover is not possible. Since, on the other hand, a regulating circuit is required for setting a predetermined light power level, it initially appears to be necessary to provide a regulating circuit for each of the required light power levels, which would require a high outlay.

Provision is made, therefore, for measuring the laser diode currents which are required for providing a first and a second light power level, and for calculating from the ratio of the light power levels to the ratio of the laser diode currents the laser diode currents which are required for setting other light power levels. This reduces the number of regulating circuits required for setting different light power levels, so that, for example, at least three regulating circuits are saved when writing to a DVD-RAM which requires five different light power levels. The principle is based on the fact that the rise of a characteristic curve which represents the ratio between light power level and laser diode current is determined using two light power levels and the measured laser diode currents. On account of the generally linear relationship between light power level and laser diode current, this characteristic curve is a straight line, which makes it possible, in a simple manner, to directly set every desired light power level in accordance with the writing strategy prescribed for a recording medium.

A further advantage of the invention is that changes in the characteristic curve gradient which are brought about by ageing are also detected and taken into account in the course of the subsequent regulation of the light intensity of the scanning beam. This is done in that the laser diode currents which result for light power levels set by means of a regulating circuit are measured at predetermined time intervals and, as a result, changes in the rise of the characteristic curve representing the relationship between light power level and laser diode current are taken into account in the course of the setting of the different light power levels.

For the circuitry realization, exemplary embodiments which require a low outlay are specified below.

The application of the invention is independent of the recording format of the optical recording media and, in principle, it can also be employed for reading from optical recording media with predetermined light power levels.

Figure 2:
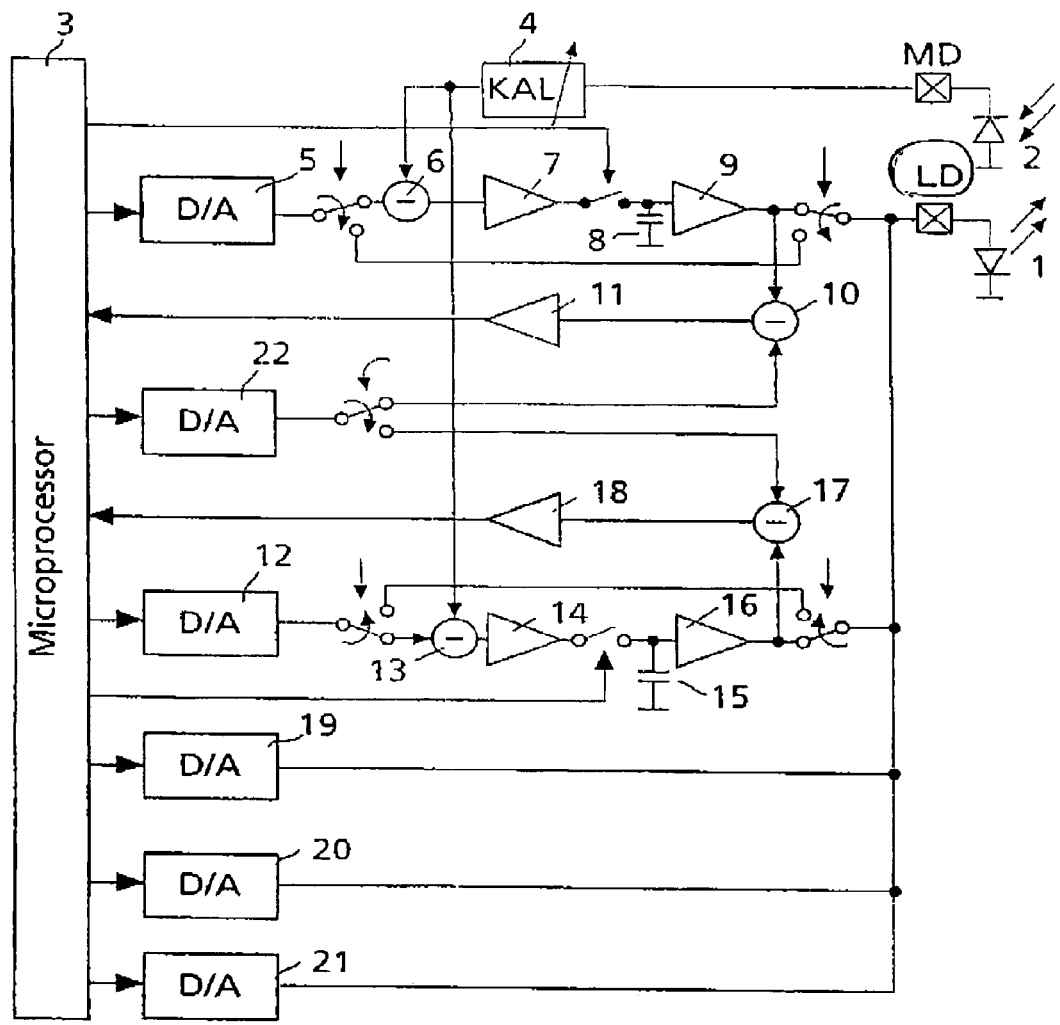
Figure 3:
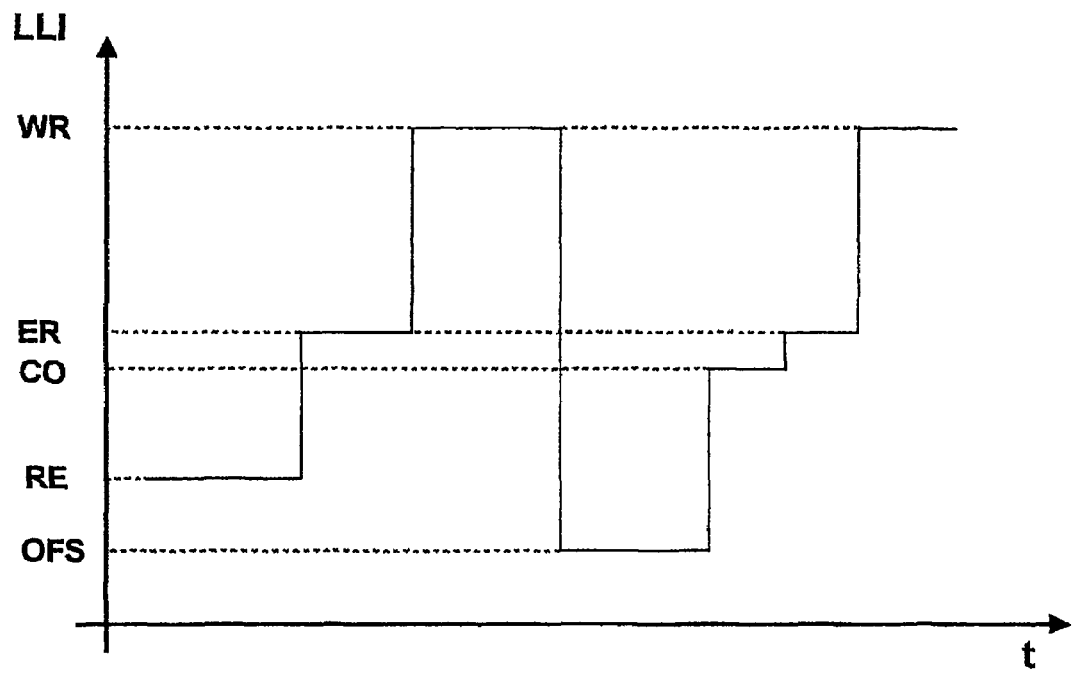
Figure 4:
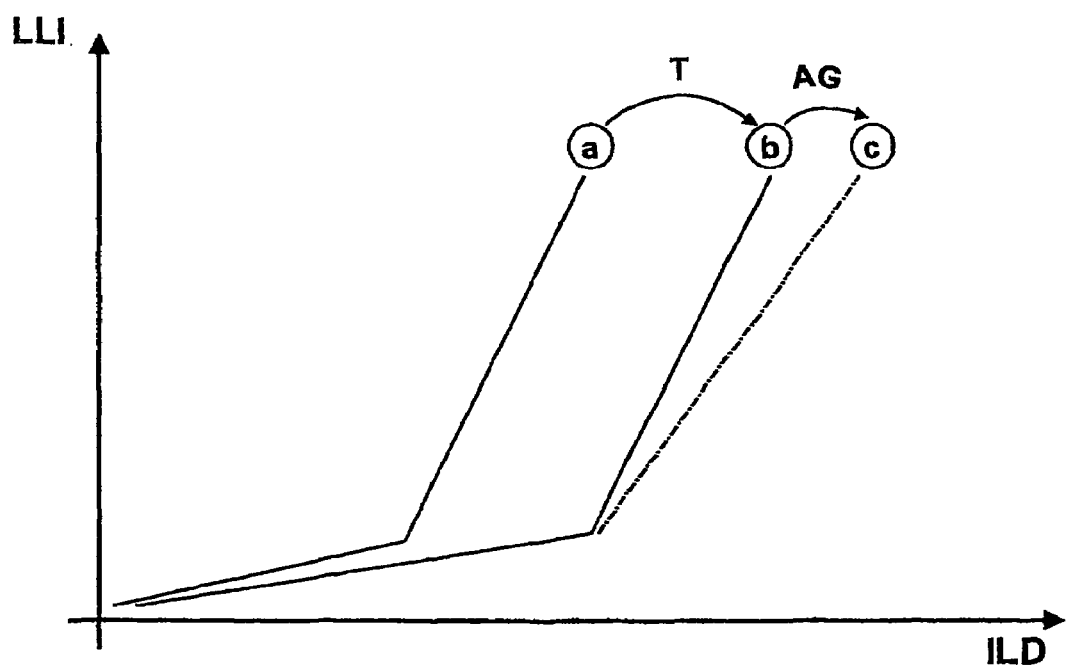
Figure 5:
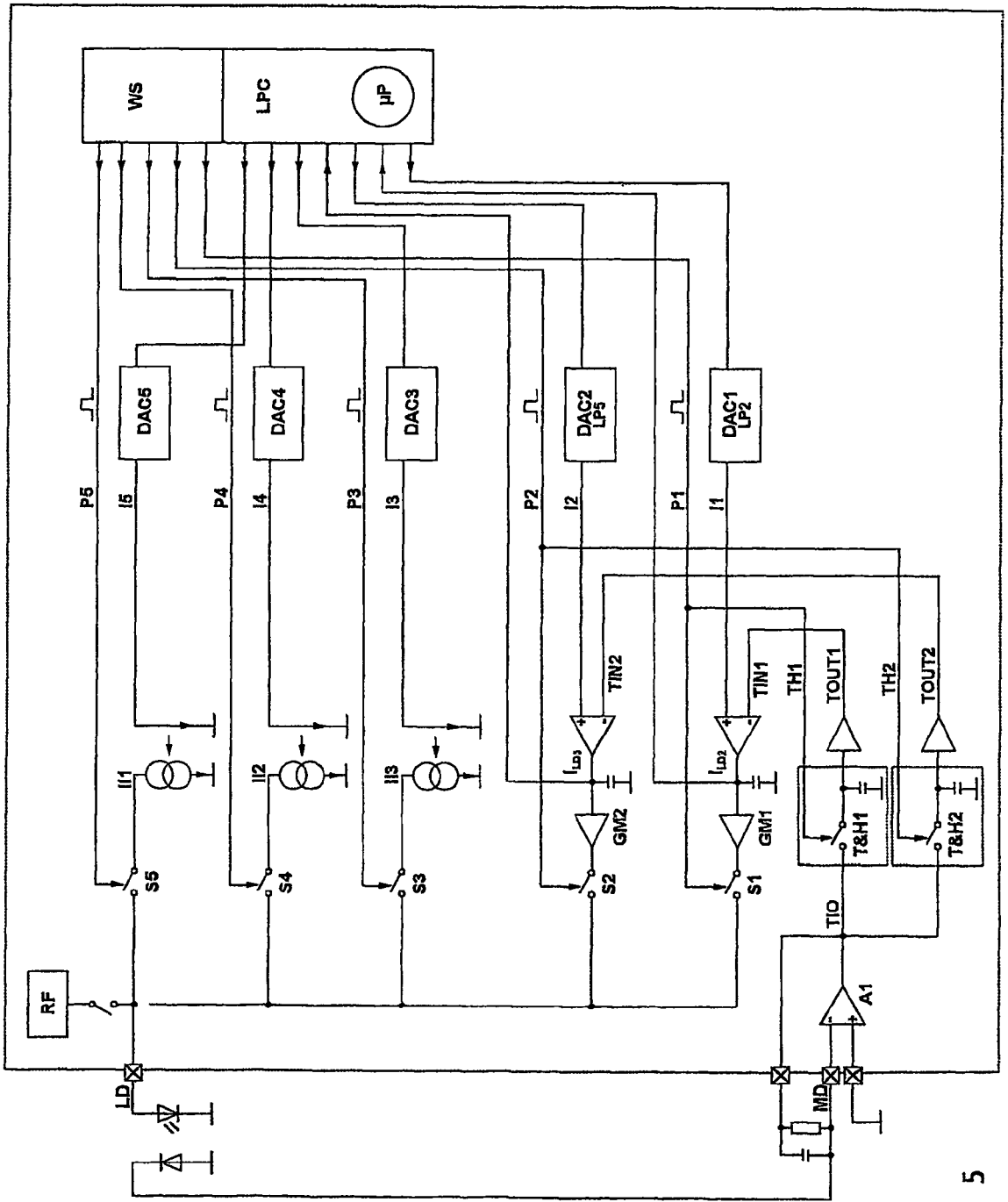
Figure 6:
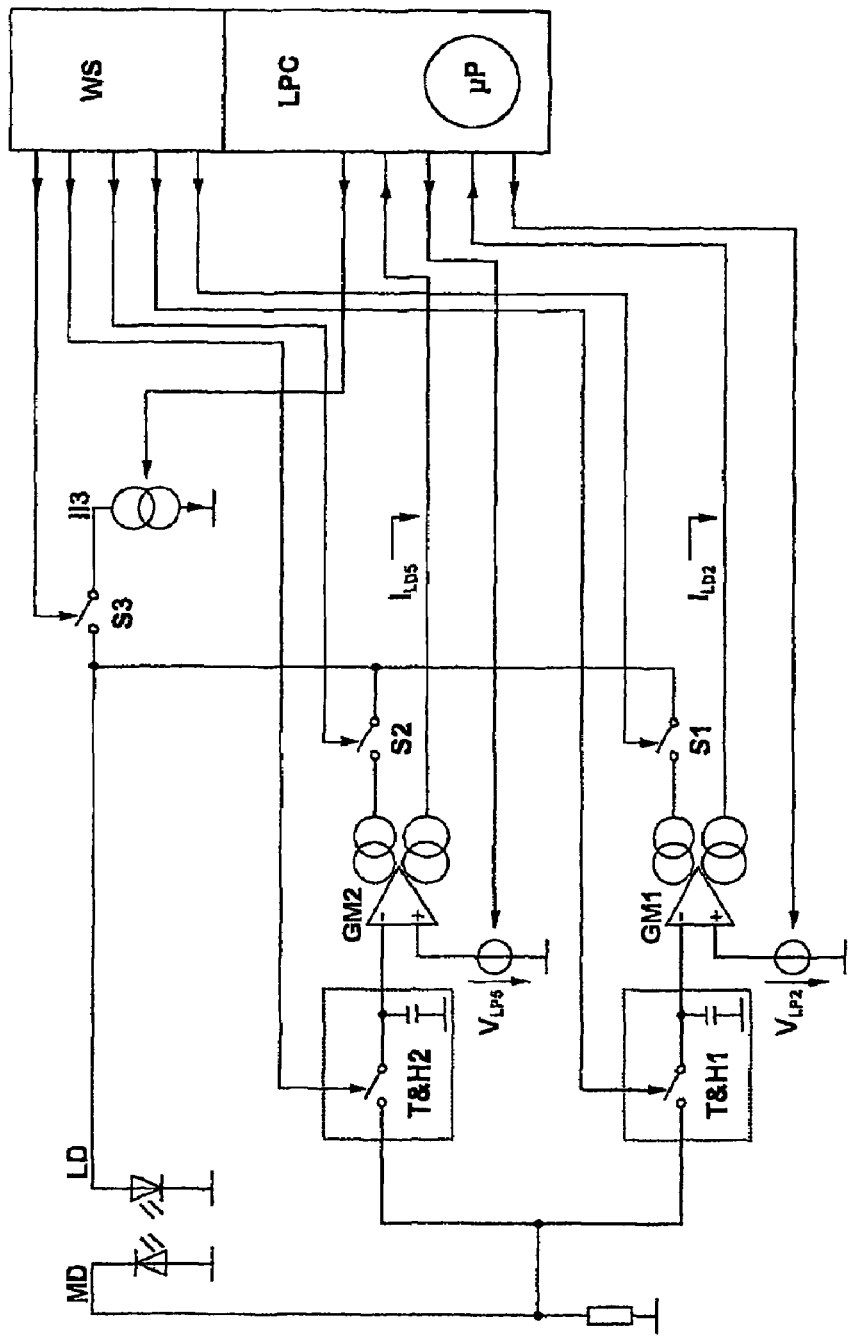

The essence of the invention is explained in more detail below in exemplary embodiments with reference to drawings, in which:

FIG. 1 shows a graphical illustration of the laser light power as a function of the laser diode current, FIG. 2 shows the schematic sketch of an arrangement for regulating the light power of a scanning beam in an apparatus for reading from or writing to optical recording media, FIG. 3 shows an illustration of the laser light intensity against a time axis for elucidating the writing strategy in the case of a DVD, FIG. 4 shows an illustration of the change in the light power as a function of the laser diode current in the case of temperature changes and ageing, FIG. 5 shows a circuit arrangement for regulating and controlling different light power levels for writing to a DVD-RAM, and FIG. 6 shows a circuit arrangement for burning a CD.

Firstly, the principle on which the present invention is based is explained below with reference to FIG. 1, it being assumed that, in an apparatus for reading from or writing to an optical recording medium, such as a DVD-RAM for example, a laser diode is used to generate the scanning or writing beam.

The laser diode provides a light power LP which, in the operating range of the laser diode, is essentially proportional to a laser diode current ILD fed to the laser diode, so that, by way of example, a light power level LP2 is generated by a laser diode current ILD2 and a light power level LP5 is generated by a laser diode current ILD5. It is thus possible, in principle, to set different laser light intensities LLI, as are illustrated in FIG. 3, for predetermined periods of time t. Thus, five different laser light intensities LLI are provided for a DVD, for example, in order to write WR to the recording medium, to erase ER it, to cool CO it, to read RE from it or to bias OFS the laser diode below the radiation onset. The values of the laser light intensity LLI are referred to as the so-called writing strategy, which is generally recorded as information on the recording medium and is prescribed by the latter.

For writing WR, erasing ER, cooling CO or reading RE, a predetermined light intensity LLI is provided, which can be realized by means of a corresponding light power level LP of the laser diode for predetermined periods of time t. However, the light power LP generated by a laser diode, and consequently a light intensity LLI that is provided, is influenced not only by the laser diode current ILD (illustrated in FIG. 1), as is illustrated in FIG. 4, but also by the temperature T and ageing AG.

A regulating circuit is conventionally used for regulating the laser light power LP or laser light intensity LLI of the scanning beam to a predetermined level, the laser light radiated by the laser diode being detected by a monitor diode and converted into a monitoring diode current which is proportional to the laser light intensity LLI of the laser diode. This monitoring diode current is evaluated in order to set, in a manner dependent thereon, the laser diode current—fed to the laser diode—for the purpose of controlling or regulating the laser light intensity LLI, the laser light intensity LLI following the laser diode current ILD in accordance with a characteristic curve that is linear in the operating range of the laser diode. The laser diode current ILD depends on tolerances of the laser diode and monitoring diode arrangements, on the temperature T and on ageing effects AG. The proportional dependence of the laser light intensity LLI on the laser diode current ILD generally remains constant. As is shown in FIG. 4, although temperature fluctuations shift the characteristic curve of the light intensity LLI from a to b, they have no influence on the rise of the characteristic curve which identifies the proportional relationship between laser diode current ILD and light intensity LLI in the operating range. Investigations have shown, however, that ageing AG brings about a change in the gradient or the rise of the characteristic curve, as is illustrated diagrammatically in FIG. 4 using characteristic curve c. This change in the rise is also referred to as clipping.

Before the regulating of the light power LP or light intensity LLI of the laser diode to different light power levels LP, a calibration to at least one light power level LP2 of the laser diode is carried out. For this purpose, in a first regulating circuit, the monitoring diode current generated by the monitoring diode is multiplied by a calibration factor KAL in such a way that the multiplied monitoring diode current corresponds to a desired value which in turn corresponds to a predetermined first laser light power level LP2.

This single calibration already makes it possible to set every desired light power level LP, since the monitoring diode—also referred to as a monitor diode—provides a monitor diode current MD which is directly proportional to the light power level LP. This is independent of the laser diode current ILD established in accordance with the light power LP required in the regulating circuit or for the purpose of providing the monitor diode current MD corresponding to the light power LP. It follows from this that a calibration point, which corresponds to a light power level LP2 for example, suffices for setting different light power levels LP or for regulating to different light power levels LP. Consequently, it is not necessary for the dependence of the light power LP on the laser diode current ILD to be known. A laser diode current ILD5 is automatically set by the regulation to a light power level LP5 with the monitor diode current MD.

In accordance with a further aspect of the invention, however, it is expedient to measure and, if appropriate, to store the laser diode currents ILD2 and ILD5, since this makes it possible to directly set light power levels LP using the laser diode current ILD. This is made possible by virtue of the fact that measurement of two laser diode currents ILD2 and ILD5 describes the characteristic curve or the rise of the characteristic curve of the laser diode in the operating range. The laser diode current ILD which is required for setting a light power level LP is then calculated from the ratio of the light power levels LP2 and LP5, for which the corresponding laser diode current ILD2 and ILD5 was determined, to the laser diode currents ILD2 and ILD5. Since the possibility is given of directly setting light power levels without a regulating circuit, corresponding regulating circuits can be saved. This is possible with high accuracy as long as no changes occur in the changes—illustrated in FIG. 4—in the light intensity LLI with regard to the laser diode current ILD.

In order, despite the changes in the light intensity LLI of the laser diode which are illustrated in FIG. 4, to enable the accurate setting of predetermined light power intensities LLI or light power levels LP even without additional regulating circuits, the abovementioned measurement of the laser diode currents ILD2 and ILD5, which are determined by means of a regulating circuit, is repeated in predetermined periods of time. As a result of the measurement of the laser diode currents ILD2 and ILD5 in predetermined periods of time or in the case of the provision of the light power levels LP2 and LP5, it is ensured that changes in the light power intensity LLI are detected and ageing phenomena AG and also temperature changes are taken into account even in the course of direct setting or setting of light power levels LP without a regulating circuit. As a result, a high accuracy of the light power levels LP is ensured even over a long period of time and independently of ambient influences.

It is once again pointed out that this measurement operation is repeated with the same calibration factor KAL for a second laser light power level LP5 in order to detect the corresponding laser diode current value ILD5. The rise of the characteristic curve which describes the dependence of the laser light power on the laser diode current is then determined from the two measurement points described above by formation of the ratio between light power change and laser diode current change.

The calibration of the light power level LP2 is preferably carried out before the regulating of the light power or light intensity of the laser diode. For this purpose, in a first regulating circuit, the monitoring diode current generated by the monitoring diode is multiplied by a calibration factor in such a way that the multiplied monitoring diode current corresponds to a light power desired value for a predetermined DAC code value, which in turn corresponds to a predetermined first laser light power level LP2. The laser diode current ILD2 established on account of this operation is measured and the calibration factor is subsequently maintained unchanged.

Ideally, two of the laser light power levels prescribed by the manufacturer of the optical recording medium correspond to the measurement points used for determining the characteristic curve gradient, so that the rise of the characteristic curve can be measured during operation.

All the other laser light power levels, the laser light power levels LP1, LP3 and LP4 in the example illustrated in FIG. 1, can subsequently be calculated and set taking account of the information now available about the characteristic curve gradient proceeding from a laser light power level LP2 already set.

The method described above always detects the instantaneously valid gradient of the characteristic curve, so that a change in the characteristic curve gradient, for example on account of ageing or clipping, is detected and taken into account in the course of the subsequent regulation, in order to compensate for the clipping effects. This merely presupposes that the dependence of the laser light power on the laser diode current is linear, which is always the case, however, in the normal operating range of the laser diode.

FIG. 2 illustrates an exemplary embodiment for the realization of the method according to the invention described above with five channels. A laser diode 1 is connected to a terminal LD, while a photodiode 2, which is used as a monitor diode and detects the present value, i.e. the actual value, of the laser light intensity or laser light power generated by the laser diode 1 and thus serves as a monitoring diode, is connected to a terminal MD. When recording information on an optical recording medium, for example on a DVD-RAM, a microprocessor 3 serves for carrying out the writing strategy described above and also for regulating the laser light intensity or laser light power generated by the laser diode 1.

Two regulating circuits are provided for carrying out the method according to the invention described above, which regulating circuits have a common calibration amplifier 4 with an adjustable calibration factor KAL. Moreover, the first regulating circuit comprises a digital/analogue converter 5, a comparator 6, an error amplifier 7, a sample/hold element 8 and also a transconductance amplifier 9. The second regulating circuit is correspondingly formed with a digital/analogue converter 12, a comparator 13, an error amplifier 14, a sample/hold element 15 and also a transconductance amplifier 16.

For calibration or for determination of the instantaneous characteristic curve gradient, the calibration factor KAL of the calibration amplifier 4 is set by the microprocessor 3 in such a way that the monitoring diode current of the monitoring diode 2, which current is multiplied by the calibration factor KAL and corresponds to the actual value of the laser light power of laser diode 1, corresponds to the laser light power LP2 which is shown in FIG. 1 and is prescribed by the microprocessor 3 via the digital/analogue converter. For this purpose, the output signals of the calibration amplifier 4 and also of the digital/analogue converter 5 are compared with one another by the comparator 6, and the resultant differential or error signal is amplified by the error amplifier 7 and the amplified differential or error value is stored in the sample/hold element 8. The transconductance amplifier 9 which follows the sample/hold element 8 adds the error signal to the laser diode current fed to the laser diode.

The function of the second regulating circuit is analogous to the function of the first regulating circuit and serves for determining the laser diode current ILD5, which corresponds to the laser light power level LP5 shown in FIG. 1. The calibration factor KAL already set is used in this case.

The values which are stored in the sample/hold elements 8 and 15, respectively, and correspond to the laser diode current ILD2 and ILD5, respectively, can be read out by the microprocessor 3 for example with the aid of comparators 10 and 17, respectively, in combination with downstream amplifiers 11 and 18, respectively, the comparator 10 and 17, respectively, comparing the output value of the transconductance amplifier 9 and 16, respectively, with the value prescribed by a digital/analogue converter 22 and the respective resultant differential value being fed via the amplifier 11 and 18, respectively, to the microprocessor 3. The output of the digital/analogue converter 22 is connected to each of the two regulating circuits via a controllable switch on the output side, so that the values stored by the sample/hold elements 8 and 15, respectively, of the two regulating circuits can be measured. The controllable switches shown in FIG. 2 are driven by the microprocessor 3 in order to obtain the desired function in each case. By monitoring the output signal of the amplifiers 11 and 18, respectively, the microprocessor 3 ascertains whether a value prescribed via the digital/analogue converter 22 corresponds to the value stored in the sample/hold element 8 and 15, respectively. Values prescribed by the digital/analogue converter 22 are changed until correspondence is reached. If the output signal of the amplifier 11 and 18, respectively, indicates a change of sign, the value prescribed via the digital/analogue converter 22 corresponds to the value stored in the sample/hold element 8 and 15, respectively.

It is necessary to use the sample/hold elements 8, 15 since the different laser light power levels are valid only within specific time windows. With the aid of the sampling switches which are shown in FIG. 2 and are connected upstream of the sample/hold elements 8, 15, the sample/hold elements 8 or 15 must be activated for the duration of the time interval which is valid for the respective laser light power level. Accordingly, the bandwidth of the calibration amplifier 4, of the comparators 6, 13 and also of the downstream error amplifiers 7, 14 must be high since these time windows usually lie in the nanoseconds range.

With the aid of the information about the two predetermined laser light power levels LP2 and LP5, respectively, and also the corresponding laser diode currents ILD2 and ILD5, respectively, which information is now known to the microprocessor 3 on account of the calibration, the microprocessor 3 determines the present gradient or the rise of the characteristic curve which is shown in FIG. 1 and describes the dependence of the laser light power LP of the laser diode 1 on the laser diode current ILD of the laser diode 1, in order to take account of changes in the characteristic curve gradient in the course of the regulation of the laser light power to the desired laser light power levels LP. For this purpose, the determination of the characteristic curve gradient can be repeated in an interval-like manner at predetermined intervals.

Afterwards, the light levels of the other channels are calculated and set by means of the digital/analogue converters 19–21 in a manner dependent on the information thus obtained about the characteristic curve gradient and also in a manner dependent on the information prescribed on the respective recording medium by the manufacturer with regard to the writing strategy to be carried out, and on the position of the two corrected operating points LP2/ILD2 and LP5/ILD5, respectively.

In accordance with FIG. 2, in order to realize the writing strategy for a DVD or to store information on a DVD, which is also referred to as burning, six digital/analogue converters 5, 22, 12, 19, 20, 21 are connected to a microprocessor 3, the digital/analogue converter 22 being provided for the purpose of determining laser diode currents ILD2, ILD5 and the other digital/analogue converters 5, 12, 19, 20, 21 being provided for the purpose of setting predetermined light power levels LP.

The output of a digital/analogue converter 5 and 12, respectively, is connected via a changeover switch to a comparator 6, 13, in which a predetermined light power level LP2, LP5 is compared with a calibrated monitor diode signal MD, which represents a present light power level. The changeover switch via which the digital/analogue converter 5, 12 is connected to the comparator 6, 13 is only provided in order, if appropriate, also to enable direct driving of the laser diode 1, but it is unimportant in connection with the essence of the invention.

The monitor signal generated by a monitoring diode 2 is fed to the comparator 6, 13 via a calibrator 5 and an error amplifier 7, 14 is connected to the comparator 6, 13, which amplifier is connected via a switch—controlled by the microprocessor 3—to a sample/hold element 8, 15 with downstream amplifier 9, 16. The amplifier 9, 16 then drives the laser diode 1 via a further changeover switch. Furthermore, comparators 10, 17 for determining a laser diode current used are connected to the outputs of the amplifiers 9, 16. For this purpose, the comparators 10, 17 are optionally connected via a changeover switch to the output of a digital/analogue converter 22, whose output values are changed until correspondence to the present laser diode current is ascertained by the microprocessor 3 with an amplifier 11, 18 connected to the comparator 10, 17. For this purpose, the outputs of the amplifiers 11, 18 are connected to the microprocessor 3. The outputs of the regulating circuits formed in this way and also the outputs of the digital/analogue converters 19, 20, 21, which are provided for the purpose of setting light power levels without regulation, are connected to one another and provide at a terminal LD the laser diode current ILD for the laser diode 1, which is required for providing a predetermined light power LP.

FIG. 5 and FIG. 6 specify further exemplary embodiments of the invention, which already make clear that the invention can be embodied in different ways without departing from the essence of the invention.

It shall be mentioned that the embodiment illustrated in FIG. 2 also comprises a series of modification possibilities which consist for example in the fact that, given sufficiently fast digital/analogue converters, the number of regulating circuits can be reduced further by two regulated light power levels LP2, LP5 being provided by one regulating circuit, or else the laser diode 1 is directly driven to different light power levels by the changeover of only one digital/analogue converter. Moreover, an embodiment of the regulating circuit or circuits using digital circuitry is also included, since this does not depart from the concept on which the invention is based.

In accordance with FIG. 5, provision is made of digital/analogue converters DAC1 and DAC2 for setting regulated light power levels LP2, LP5, and a laser diode current required for setting a predetermined light power level LP is provided by the digital/analogue converters DAC1 . . . DAC5 via switches S1 . . . S5 which are driven in accordance with the writing strategy WS. In accordance with the embodiment illustrated in FIG. 5, current transformers I1, I2, I3 for providing corresponding laser diode currents ILD are provided at the outputs of the digital/analogue converters DAC3 . . . DAC5. The transconductance amplifiers 9, 16 of FIG. 2 are formed by amplifiers GM1, GM2 with a current output in FIG. 5. Sample/hold elements T&H1, T&H2 are likewise provided, but in this exemplary embodiment they are provided upstream of a comparator in which a comparison with the monitor diode signal MD or T10 corresponding to a present light power level is carried out. An RF signal RF which can be connected via a switch is provided at the laser diode input LD for additional superposition with the laser diode current ILD, in order to ensure, for example, an advantageous excitation of the laser. In accordance with FIG. 5, the microprocessor μP is subdivided into a part which provides the writing strategy WS and a part which undertakes the light power control LPC, so that the writing strategy WS is realized in a manner uninfluenced by other activities of the microprocessor μp.

The embodiment illustrated in FIG. 6 is provided for burning CDs, only three light power levels having to be provided, which are realized via switches S1 . . . S2. The concept illustrated in FIG. 6 provides a desired/actual value comparison VLP2, VLP5 at the differential input of a transconductance amplifier GM1, GM2 with two current outputs, in order to provide the laser diode current ILD with one output and the measured laser diode current ILD2, ILD5 with the other output.

The embodiments of the invention which are described here are specified only by way of example. On the basis of the teaching according to the invention, a person skilled in the art can realize other embodiments which remain within the scope of the invention.

The invention claimed is:

1. Apparatus for regulating the light power of a scanning beam to one of a plurality of desired light power levels in an apparatus for reading from and/or writing to an optical recording medium, and said apparatus comprises a driving apparatus for sequentially supplying a plurality of driving currents to a light source for providing the desired light power level of the scanning beam, monitoring means for detecting a predetermined light power level of the light source and setting means as well as regulating means for setting plural desired light power levels, wherein provision is made of calibration means for carrying out a calibration of a driving current to a light power level of the light source, and the regulating means are configured in such a way that they carry out the regulation of the driving current for the light power of the scanning beam by a comparison between a driving current supplying the light source for regulating the light source with a calibration factor to a predetermined light power level and a present driving current to provide said predetermined light power level with said driving apparatus for setting the driving current of said driving apparatus for one of said plurality of desired light power levels of the scanning beam.

2. Apparatus according to claim 1, wherein the calibration means comprise at least a first regulating circuit and a second regulating circuit, the first regulating circuit, by the setting of a calibration factor, being provided for the regulation of the light power of the scanning beam of the light source to a first light power level and the second regulating circuit being provided for the regulation of the light power of the scanning beam of the light source to a second light power level using the same calibration factor, and in that the calibration means have measurement means for measuring the current fed to the light source in the course of the regulation to the first light power level and the current fed to the light source in the course of the regulation to the second light power level, the measurement means being connected to the regulating means, and in that the regulating means are configured in such a way that, as a function of the measurement signals supplied by the measurement means, they determine a characteristic curve which describes the relationship between the current fed to the light source and the light power generated by the light source and subsequently take it into account in the course of the regulation of the light power of the scanning beam of the light source.

3. Apparatus according to claim 2, wherein the first and second regulating circuits are coupled to a means for detecting the light power instantaneously generated by the light source.

4. Apparatus according to claim 2, wherein the first and second regulating circuits in each case have a sample/hold element for storing a value which describes the current which is fed to the light source and corresponds to the first and second light power level, respectively.

5. Apparatus according to claim 1, wherein the light source is a laser diode, and the calibration means and also the regulating means are configured for calibrating and also for regulating the light intensity of the laser diode.

6. Apparatus according to claim 1, wherein the desired light power level corresponds to a light power level prescribed by the manufacturer of the optical recording medium.

* * * * *